(12) United States Patent
Pawar et al.

(10) Patent No.: US 12,346,213 B2
(45) Date of Patent: *Jul. 1, 2025

(54) USING EPHEMERAL STORAGE AS BACKING STORAGE FOR JOURNALING BY A VIRTUAL STORAGE SYSTEM

(71) Applicant: Netapp, Inc., San Jose, CA (US)

(72) Inventors: Sangramsinh Pandurang Pawar, Bedford, MA (US); Per Olov Wahlstrom, San Jose, CA (US); William Derby Dallas, Merrimack, NH (US); Joseph Brown, Jr., Raleigh, NC (US); Houze Xu, Lexington, MA (US); John David McA'Nulty, Westford, MA (US); Rajesh Rajaraman, Action, MA (US)

(73) Assignee: NetApp, Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/360,221

(22) Filed: Jul. 27, 2023

(65) Prior Publication Data

US 2023/0367677 A1 Nov. 16, 2023

Related U.S. Application Data

(63) Continuation of application No. 17/703,307, filed on Mar. 24, 2022, now Pat. No. 11,748,204.
(Continued)

(51) Int. Cl.
*G06F 11/00* (2006.01)
*G06F 9/4401* (2018.01)
*G06F 11/14* (2006.01)

(52) U.S. Cl.
CPC ........ *G06F 11/1451* (2013.01); *G06F 9/4411* (2013.01); *G06F 11/1456* (2013.01); *G06F 11/1471* (2013.01)

(58) Field of Classification Search
CPC ............. G06F 11/1417; G06F 11/1451; G06F 11/1456; G06F 11/1471; G06F 11/2284; G06F 11/27; G06F 2211/1097
See application file for complete search history.

(56) References Cited

U.S. PATENT DOCUMENTS

| 9,684,532 B2 | 6/2017 | Usgaonkar et al. |
| 11,748,204 B1 | 9/2023 | Pawar et al. |

(Continued)

FOREIGN PATENT DOCUMENTS

EP 3608770 A1 2/2020

OTHER PUBLICATIONS

Non-Final Office Action mailed on Dec. 17, 2024 for U.S. Appl. No. 18/168,844, filed Feb. 14, 2023, 09 pages.
(Continued)

*Primary Examiner* — Michael Maskulinski
(74) *Attorney, Agent, or Firm* — Jaffery Watson Hamilton & DeSanctis LLP

(57) ABSTRACT

Systems and methods for making use of non-persistent storage as the journaling storage media for a virtual storage system are provided. According to one embodiment, in order to meet the needs of Extreme Low Latency Workloads while also seeking to provide predictable performance and the lowest possible latency, ephemeral storage of the virtual storage system is used to preserve state information (e.g., in the form of boot arguments and an operation log journal) across a host failure recovery scenario in which the virtual storage system is expected to be redeployed within a compute instance brought up by a cloud environment of a hyperscaler on the same host, thereby providing improved data durability (fewer host failure scenarios that result in lost data) as compared to the use of ephemeral memory of the (Continued)

compute instance and lower write latency than the use of persistent storage provided by the cloud environment.

20 Claims, 5 Drawing Sheets

Related U.S. Application Data

(60) Provisional application No. 63/313,818, filed on Feb. 25, 2022.

(56) References Cited

U.S. PATENT DOCUMENTS

| | | |
|---|---|---|
| 12,189,972 B2 | 1/2025 | Brown, Jr. |
| 2016/0055018 A1 | 2/2016 | Usgaonkar et al. |
| 2016/0210199 A1 | 7/2016 | Christensen et al. |
| 2019/0042144 A1 | 2/2019 | Peterson et al. |
| 2019/0050289 A1 | 2/2019 | Kachare et al. |
| 2022/0350489 A1 | 11/2022 | Kanno |
| 2023/0273753 A1 | 8/2023 | Pawar et al. |

OTHER PUBLICATIONS

Co-pending U.S. Appl. No. 18/309,148, inventor Brown Jr.; Joseph, filed on Apr. 28, 2023.
Co-pending U.S. Appl. No. 18/309,162, inventor Brown Jr.; Joseph, filed on Apr. 28, 2023.
Notice of Allowance mailed on Apr. 28, 2023 for U.S. Appl. No. 17/703,307, filed Mar. 24, 2022, 9 pages.
Notice of Allowance mailed on Aug. 29, 2024 for U.S. Appl. No. 18/309,162, filed Apr. 28, 2023, 7 pages.

USING EPHEMERAL STORAGE AS BACKING STORAGE FOR JOURNALING BY A VIRTUAL STORAGE SYSTEM

CROSS-REFERENCE TO RELATED PATENTS

This application is a continuation of U.S. patent application Ser. No. 17/703,307, filed Mar. 24, 2022, which claims the benefit of priority to U.S. Provisional Application No. 63/313,818 filed on Feb. 25, 2022, both of which are hereby incorporated by reference in their entirety for all purposes.

BACKGROUND

Field

Various embodiments of the present disclosure generally relate to virtual storage systems. In particular, some embodiments relate to an approach for making use of a non-persistent storage (e.g., an ephemeral disk) as the backing storage for journaling performed by a virtual storage system.

Description of the Related Art

When a file system of a storage system, such as a storage server computing device, receives a write request, it commits the data to permanent storage before the request is confirmed to the writer. Otherwise, if the storage system were to experience a failure with data only in volatile memory, that data would be lost, and underlying file structures could become corrupted. Physical storage appliances commonly use battery-backed high-speed non-volatile random access memory (NVRAM) as a journaling storage media to journal writes and accelerate write performance while providing permanence, because writing to memory is much faster than writing to storage (e.g., disk). Storage systems may also implement a buffer cache in the form of an in-memory cache to cache data that is read from data storage media (e.g., local mass storage devices or a storage array associated with the storage system) as well as data modified by write requests. In this manner, in the event a subsequent access relates to data residing within the buffer cache, the data can be served from local, high performance, low latency storage, thereby improving overall performance of the storage system. The modified data may be periodically (e.g., every few seconds) flushed to the data storage media. As the buffer cache is limited in size, an additional cache level may be provided by a victim cache, typically implemented within a slower memory or storage device than utilized by the buffer cache, that stores data evicted from the buffer cache.

The event of saving the modified data to the mass storage devices may be referred to as a consistency point (CP). At a CP point, the file system may save any data that was modified by write requests to persistent data storage media. When operating in high-availability (HA) mode, the CP point may also trigger a process of updating the mirrored data stored at an HA partner. As will be appreciated, when using a buffer cache, there is a small risk of a system failure occurring between CPs, causing the loss of data modified after the last CP. Consequently, the storage system may maintain an operation log or journal of certain storage operations within the journaling storage media that have been performed since the last CP. This log may include a separate journal entry (e.g., including an operation header) for each storage request received from a client that results in a modification to the file system or data. Such entries for a given file may include, for example, "Create File," "Write File Data," and the like. Depending upon the operating mode or configuration of the storage system, each journal entry may also include the data to be written according to the corresponding request. The journal may be used in the event of a failure to recover data that would otherwise be lost. For example, in the event of a failure, it may be possible to replay the journal to reconstruct the current state of stored data just prior to the failure.

When a storage system is hosted in a cloud environment, the storage system may be referred to as a virtual storage system. In cloud environments, there is no availability of non-volatile memory or persistent storage having the performance characteristics of NVRAM.

SUMMARY

Systems and methods are described for making use of a non-persistent storage as the journaling storage media for a virtual storage system. According to one embodiment, a virtual storage system deployed within a compute instance of a host of a public cloud environment discovers one or more direct-attached storage (DAS) devices of the host that are associated with the compute instance. The virtual storage system determines whether it has been brought up on the host after recovery from a failure. Access to an operation log that was maintained by the virtual storage system within the discovered one or more DAS devices prior to the failure is regained by registering at least a subset of the discovered one or more DAS devices for use as a journaling storage media by the virtual storage system.

Other features of embodiments of the present disclosure will be apparent from accompanying drawings and detailed description that follows.

BRIEF DESCRIPTION OF THE DRAWINGS

In the Figures, similar components and/or features may have the same reference label. Further, various components of the same type may be distinguished by following the reference label with a second label that distinguishes among the similar components. If only the first reference label is used in the specification, the description is applicable to any one of the similar components having the same first reference label irrespective of the second reference label.

DETAILED DESCRIPTION

Figure 1:
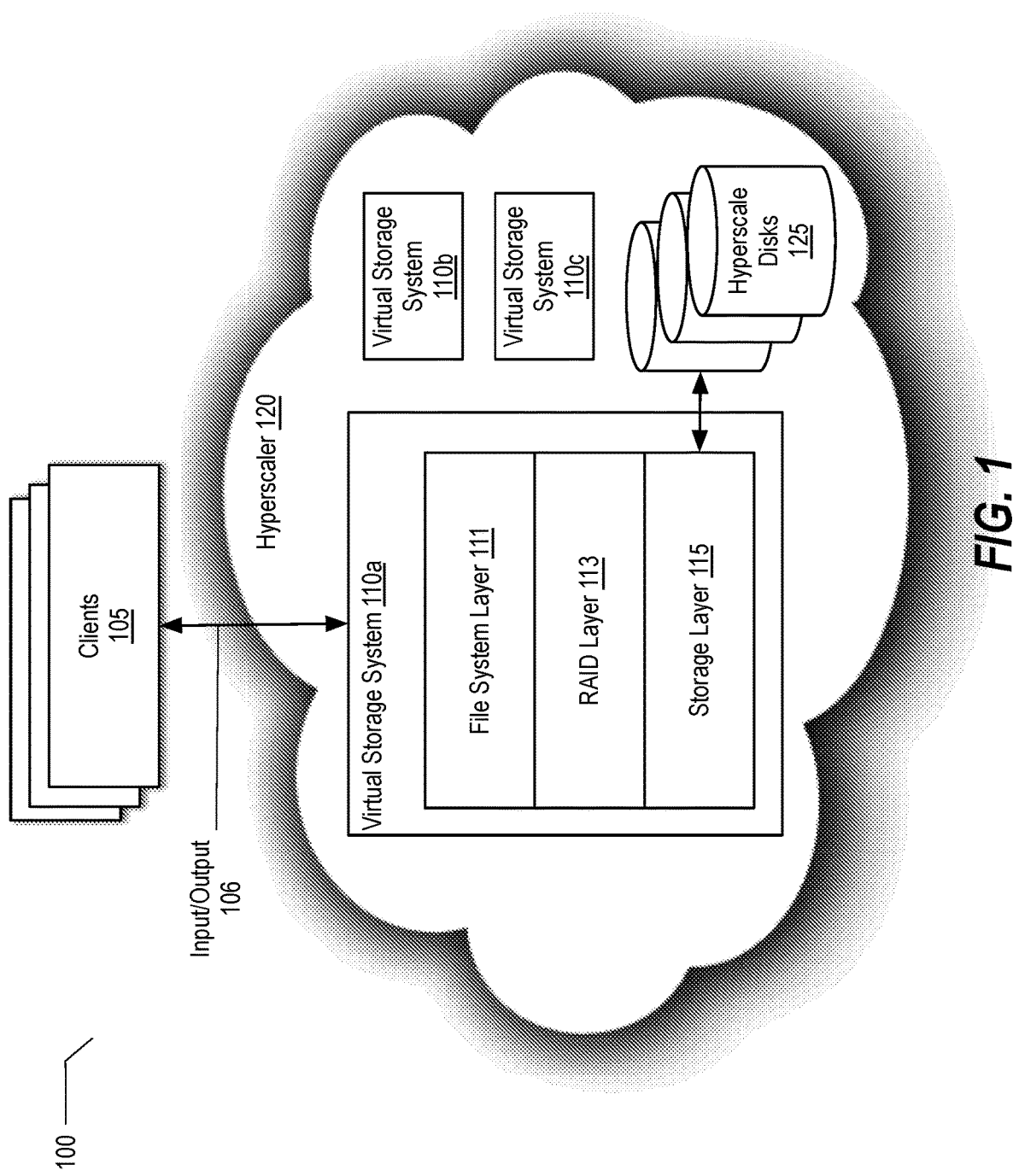
FIG. 1 is a block diagram illustrating an environment in which various embodiments may be implemented.

Systems and methods are described for making use of a non-persistent storage as the journaling storage media for a virtual storage system. As noted above, a virtual storage system does not have access to non-volatile memory or persistent storage having similar performance characteristics as NVRAM for use in connection with performing operation log journaling (which may be referred to simply as "journaling" herein). As such, the file system of the virtual storage system, depending upon the nature of the workloads expected to be supported and/or the configuration of the system, may instead rely on one of two options:

a first option in which persistent storage (e.g., a network attached storage device) provided by a hyperscaler (e.g., a cloud service provider) in which the virtual storage system is running is used as the journaling storage media (which may be referred to herein as "virtual NVRAM" or "vNVRAM" as traditionally in a physical storage system NVRAM is used as the journaling storage media); or a second option in which an ephemeral memory of the compute instance (e.g., virtual machine (VM) or container) in which the virtual storage system is running is used as the journaling storage media.

Various tradeoffs exist between performance and data durability (e.g., the ability to keep the stored data consistent) depending on the nature of the journaling storage media and other factors as discussed below. Relatively higher durability may be achieved by using persistent storage as the journaling storage media (the first option above) but at the cost of lower write speeds. Alternatively, relatively higher write speeds may be achieved when making use of ephemeral memory as the journaling storage media (the second option above); however, this comes with low durability as any data stored in ephemeral memory is lost when a host failure causes the compute instance to go down and the compute instance is rehosted on another host.

As will be appreciated, when the journaling storage media (i.e., the backing storage or memory for operation log journaling) and data storage media (i.e., the backing storage for persistent storage of data) have comparable latency and performance characteristics, such as when persistent storage (e.g., disks) is used for both the journaling storage media and data storage media, writing to both media before acknowledging a write request made by a client increases latency and counts against input/output operations per second (IOPS) limits associated with such media. Improvements have been made to file systems to mitigate latency and TOPS usage when the journaling storage media and the data storage media have similar latency, including single instance data logging (SIDL) and SIDL with single input/output (I/O). When SIDL is enabled, instead of writing everything to the journaling storage media, metadata (e.g., write operation headers) are journaled, journaling of data associated with write operations is avoided, and the data is written directly to the data storage media, thereby reducing write latency as compared to when SIDL is disabled. SIDL with single I/O represents an optimized mode for SIDL that is capable of exploiting compressible data to further improve write performance. Additional discussion regarding SIDL and single I/O write is provided in U.S. patent application Ser. No. 17/672,401, which is hereby incorporated by reference in its entirety for all purposes. The aforementioned improvements increase write speed for high durability configurations, but may not be suitable for a certain type of workload having extreme sensitivity to latency (which may be referred to herein as an "Extreme Low Latency Workload"), such as an SAP high-performance analytic appliance (HANA) and a MongoDB.

Also affecting the tradeoffs between performance and data durability are the various characteristics of the HA configuration employed by the cloud service provider for managing a cluster of virtual storage systems. Cloud service providers may maintain data centers in multiple geographic regions and each region may include distinct locations or availability zones (AZs) within each region that are engineered to be isolated from failures in other AZs. When HA partner virtual storage systems are deployed within the same AZ, which may be referred to herein as a "Single-AZ HA Configuration"), latency is low due to intra-AZ communications but there is a much greater probability of both virtual storage systems going down simultaneously than when HA partner virtual storage systems are deployed in different AZs of the same region, which may be referred to herein as a Multi-AZ HA Configuration").

In order to meet the needs of Extreme Low Latency Workloads while seeking to provide predictable performance and the lowest possible latency, embodiments described herein make available a third option for the journaling storage media of a virtual storage system. As described further below, this third option involves the use of non-persistent storage (e.g., ephemeral storage or an ephemeral disk) to preserve state information (e.g., in the form of boot arguments and the journal) across a host failure recovery scenario resulting in redeployment of the virtual storage system within a compute instance brought up on the same host, rehosting the compute instance on a new host, and from boot to boot of the virtual storage system, thereby providing improved data durability (fewer host failure scenarios that result in lost data) over the second option noted above and lower write latency than the first option noted above. Because data stored on such non-persistent storage is generally lost when the compute instance with which it is associated is stopped or terminated, certain assumptions are made herein regarding guarantees expected to be upheld by a cloud service provider to support this third option. For example, embodiments described herein may assume:

Ephemeral storage (e.g., one or more ephemeral disks) identified during a storage discovery process are attached directly to the compute instance.

Should a compute instance go down due to an underlying recoverable host error, the cloud service provider will bring up the compute instance on the same host. In which case, the contents of the journal will remain on the attached ephemeral storage, if any.

In the following description, numerous specific details are set forth in order to provide a thorough understanding of embodiments of the present disclosure. It will be apparent, however, to one skilled in the art that embodiments of the present disclosure may be practiced without some of these specific details. In other instances, well-known structures and devices are shown in block diagram form.

Terminology

Brief definitions of terms used throughout this application are given below.

A "computer" or "computer system" may be one or more physical computers, virtual computers, or computing devices. As an example, a computer may be one or more server computers, cloud-based computers, cloud-based cluster of computers, virtual machine instances or virtual machine computing elements such as virtual processors, storage and memory, data centers, storage devices, desktop computers, laptop computers, mobile devices, or any other special-purpose computing devices. Any reference to "a computer" or "a computer system" herein may mean one or more computers, unless expressly stated otherwise.

The terms "connected" or "coupled" and related terms are used in an operational sense and are not necessarily limited to a direct connection or coupling. Thus, for example, two devices may be coupled directly, or via one or more intermediary media or devices. As another example, devices may be coupled in such a way that information can be passed there between, while not sharing any physical connection with one another. Based on the disclosure provided herein, one of ordinary skill in the art will appreciate a variety of ways in which connection or coupling exists in accordance with the aforementioned definition.

If the specification states a component or feature "may", "can", "could", or "might" be included or have a characteristic, that particular component or feature is not required to be included or have the characteristic.

As used in the description herein and throughout the claims that follow, the meaning of "a," "an," and "the" includes plural reference unless the context clearly dictates otherwise. Also, as used in the description herein, the meaning of "in" includes "in" and "on" unless the context clearly dictates otherwise.

The phrases "in an embodiment," "according to one embodiment," and the like generally mean the particular feature, structure, or characteristic following the phrase is included in at least one embodiment of the present disclosure and may be included in more than one embodiment of the present disclosure. Importantly, such phrases do not necessarily refer to the same embodiment.

As used herein a "cloud" or "cloud environment" broadly and generally refers to a platform through which cloud computing may be delivered via a public network (e.g., the Internet) and/or a private network. The National Institute of Standards and Technology (NIST) defines cloud computing as "a model for enabling ubiquitous, convenient, on-demand network access to a shared pool of configurable computing resources (e.g., networks, servers, storage, applications, and services) that can be rapidly provisioned and released with minimal management effort or service provider interaction." P. Mell, T. Grance, The NIST Definition of Cloud Computing, National Institute of Standards and Technology, USA, 2011. The infrastructure of a cloud may cloud may be deployed in accordance with various deployment models, including private cloud, community cloud, public cloud, and hybrid cloud. In the private cloud deployment model, the cloud infrastructure is provisioned for exclusive use by a single organization comprising multiple consumers (e.g., business units), may be owned, managed, and operated by the organization, a third party, or some combination of them, and may exist on or off premises. In the community cloud deployment model, the cloud infrastructure is provisioned for exclusive use by a specific community of consumers from organizations that have shared concerns (e.g., mission, security requirements, policy, and compliance considerations), may be owned, managed, and operated by one or more of the organizations in the community, a third party, or some combination of them, and may exist on or off premises. In the public cloud deployment model, the cloud infrastructure is provisioned for open use by the general public, may be owned, managed, and operated by a cloud provider (e.g., a business, academic, or government organization, or some combination of them), and exists on the premises of the cloud provider. The cloud service provider may offer a cloud-based platform, infrastructure, application, or storage services as-a-service, in accordance with a number of service models, including Software-as-a-Service (SaaS), Platform-as-a-Service (PaaS), and/or Infrastructure-as-a-Service (IaaS). In the hybrid cloud deployment model, the cloud infrastructure is a composition of two or more distinct cloud infrastructures (private, community, or public) that remain unique entities, but are bound together by standardized or proprietary technology that enables data and application portability (e.g., cloud bursting for load balancing between clouds).

As used herein "ephemeral storage" or an "ephemeral disk" generally refers to volatile temporary storage that is physically attached to the same host on which a compute instance is running and which is present during the running lifetime of the compute instance. For example, ephemeral storage may represent one or more internal or external hard-disk drives (HDDs and/or solid-state drives (SSDs) of the physical host that are directly attached (i.e., without going through one or more intermediate devices of a network) to the physical host though an interface (e.g., Small Computer System Interface (SCSI), Serial Advanced Technology Attachment (SATA), Serial-Attached SCSI (SAS), FC or Internet SCSI (iSCSI)). Ephemeral storage is not networked. That is, there are no connections through Ethernet or FC switches as is the case for network-attached storage (NAS) or a storage area network (SAN). Non-limiting examples of ephemeral storage include an Elastic Compute Cloud (EC2) instance store in the context of Amazon Web Services (AWS), an ephemeral operating system (OS) disk in the context of Microsoft Azure, and ephemeral disks (local SSD) in the context of Google Cloud Platform (GCP). As noted above, in the event a compute instance goes down due to an underlying recoverable host error, it is assumed herein that the cloud service provider will bring up the compute instance on the same host, thereby maintaining access to data (e.g., an operation log or journal) stored to the ephemeral storage by a virtual storage system associated with the compute instance.

As used herein an "operation log," a "journal," or an "NV operation log" generally refers to a data structure in which journal entries, for example, including headers of I/O operations and potentially data associated with the I/O operations are stored. The journal may be used to facilitate maintaining data synchronization between HA partners and returning to HA mode after one of the HA partners recovers from a failure.

Example Operating Environment

FIG. 1 is a block diagram illustrating an environment 100 in which various embodiments may be implemented. In various examples described herein, a virtual storage system 110a, which may be considered exemplary of virtual storage systems 110b-c, may be run (e.g., on a VM or as a containerized instance, as the case may be) within a public cloud provided by a public cloud provider (e.g., hyperscaler 120). In the context of the present example, the virtual storage system 110a makes use of storage (e.g., hyperscale disks 125) provided by the hyperscaler, for example, in the form of solid-state drive (SSD) backed or hard-disk drive (HDD) backed disks. The cloud disks (which may also be referred to herein as cloud volumes, storage devices, or simply volumes or storage) may include persistent storage (e.g., disks) and/or ephemeral storage (e.g., disks).

The virtual storage system 110a may present storage over a network to clients 105 using various protocols (e.g., small computer system interface (SCSI), Internet small computer system interface (ISCSI), fibre channel (FC), common Internet file system (CIFS), network file system (NFS), hypertext transfer protocol (HTTP), web-based distributed authoring and versioning (WebDAV), or a custom protocol. Clients 105 may request services of the virtual storage system 110 by issuing Input/Output requests 106 (e.g., file system protocol messages (in the form of packets) over the network). A representative client of clients 105 may comprise an application, such as a database application, executing on a computer that "connects" to the virtual storage system 110 over a computer network, such as a point-to-point link, a shared local area network (LAN), a wide area network (WAN), or a virtual private network (VPN) implemented over a public network, such as the Internet.

In the context of the present example, the virtual storage system 110a is shown including a number of layers, including a file system layer 111 and one or more intermediate storage layers (e.g., a RAID layer 113 and a storage layer 115). These layers may represent components of data management software (not shown) of the virtual storage system 110. The file system layer 111 generally defines the basic interfaces and data structures in support of file system operations (e.g., initialization, mounting, unmounting, creating files, creating directories, opening files, writing to files, and reading from files). A non-limiting example of the file system layer 111 is the Write Anywhere File Layout (WAFL) Copy-on-Write file system (which represents a component or layer of ONTAP software available from NetApp, Inc. of San Jose, CA).

The RAID layer 113 may be responsible for encapsulating data storage virtualization technology for combining multiple hyperscale disks 125 into RAID groups, for example, for purposes of data redundancy, performance improvement, or both. The storage layer 115 may include storage drivers for interacting with the various types of hyperscale disks 125 supported by the hyperscaler 120. Depending upon the particular implementation the file system layer 111 may persist data to the hyperscale disks 125 using one or both of the RAID layer 113 and the storage layer 115.

The various layers described herein, and the processing described below with reference to the flow diagrams of FIGS. 3 and 4 may be implemented in the form of executable instructions stored on a machine readable medium and executed by a processing resource (e.g., a microcontroller, a microprocessor, central processing unit core(s), an application-specific integrated circuit (ASIC), a field programmable gate array (FPGA), and the like) and/or in the form of other types of electronic circuitry. For example, the processing may be performed by one or more virtual or physical computer systems of various forms (e.g., servers, blades, network storage systems or appliances, and storage arrays, such as the computer system described with reference to FIG. 5 below.

Example Host

Figure 2:
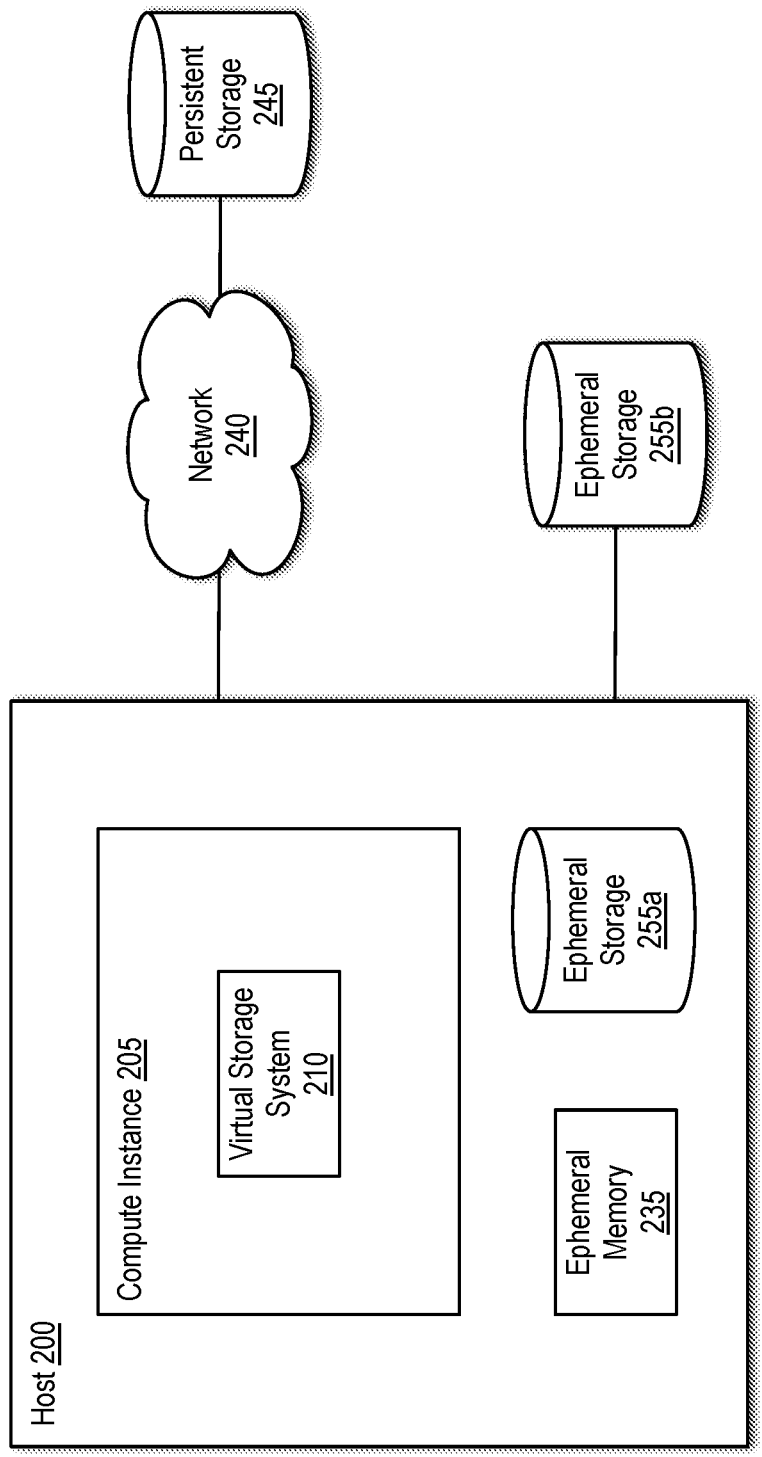
FIG. 2 is a block diagram conceptually illustrating a host of a cloud environment in accordance with an embodiment of the present disclosure

FIG. 2 is a block diagram conceptually illustrating a host 200 of a cloud environment in accordance with an embodiment of the present disclosure. In the context of the present example, host 200 may represent a physical host (e.g., a server computer system) on which a compute instance 205 (e.g., a container or a VM) may be run in a cloud environment provided by a cloud service provider (e.g., hyperscaler 120). As described further below with reference to FIG. 3, in one embodiment, a virtual storage system 210, which may be analogous to one of virtual storage systems 110a-c) may perform a boot process to discover ephemeral storage (e.g., ephemeral storage 255a-b) associated with the compute instance 205 and may assign some portion of the discovered ephemeral storage as backing storage for operation log journaling and/or may assigned some portion of the discovered ephemeral storage for use as a victim cache of the virtual storage system 210.

As noted above, existing virtual storage systems may make use of persistent storage (e.g., persistent storage 245) or ephemeral memory 235 of the host 200 as backing storage for performance of operation log journaling. The use of persistent storage 245 as the journaling storage media generally gives rise to relatively lower write speeds as compared to the use of ephemeral memory 235 as the journal storage media as a result of the persistent storage 245 (e.g., one or more network attached hyperscale disks representing HDDs and/or SSDs) being indirectly attached to the host 200 via a network (e.g., 240) within the cloud environment whereas use of the ephemeral memory 235 (e.g., a portion of random access memory (RAM) of the host 200) provides less data durability due to the volatile nature.

Rather than making use of persistent storage 245 or ephemeral memory 235, in the context of various examples described herein ephemeral storage is used as the journal storage media. Ephemeral storage may represent direct-attached-storage (DAS) to host 200 in the form of one or more internal (e.g., ephemeral storage 255a) and/or external (e.g., ephemeral storage 255b) storage devices, such as HDDs and/or SSDs, to host 200. In the context of the present example, ephemeral storage is directly attached to host 200 through a physical host interface (e.g., SCSI, SATA, SAS, FC, or iSCSI). That is, the ephemeral storage is not networked and traffic exchanged between the host 200 and the ephemeral storage does not pass through any intermediate network devices associated with the cloud environment. In this manner, operation log journaling may be performed with lower latency than an approach in which persistent storage 245 is used as the journal storage media and (assuming the cooperation of the cloud service provider), with higher data durability than an approach in which ephemeral memory 235 is used as the journal storage media.

Example Boot Process

Figure 3:
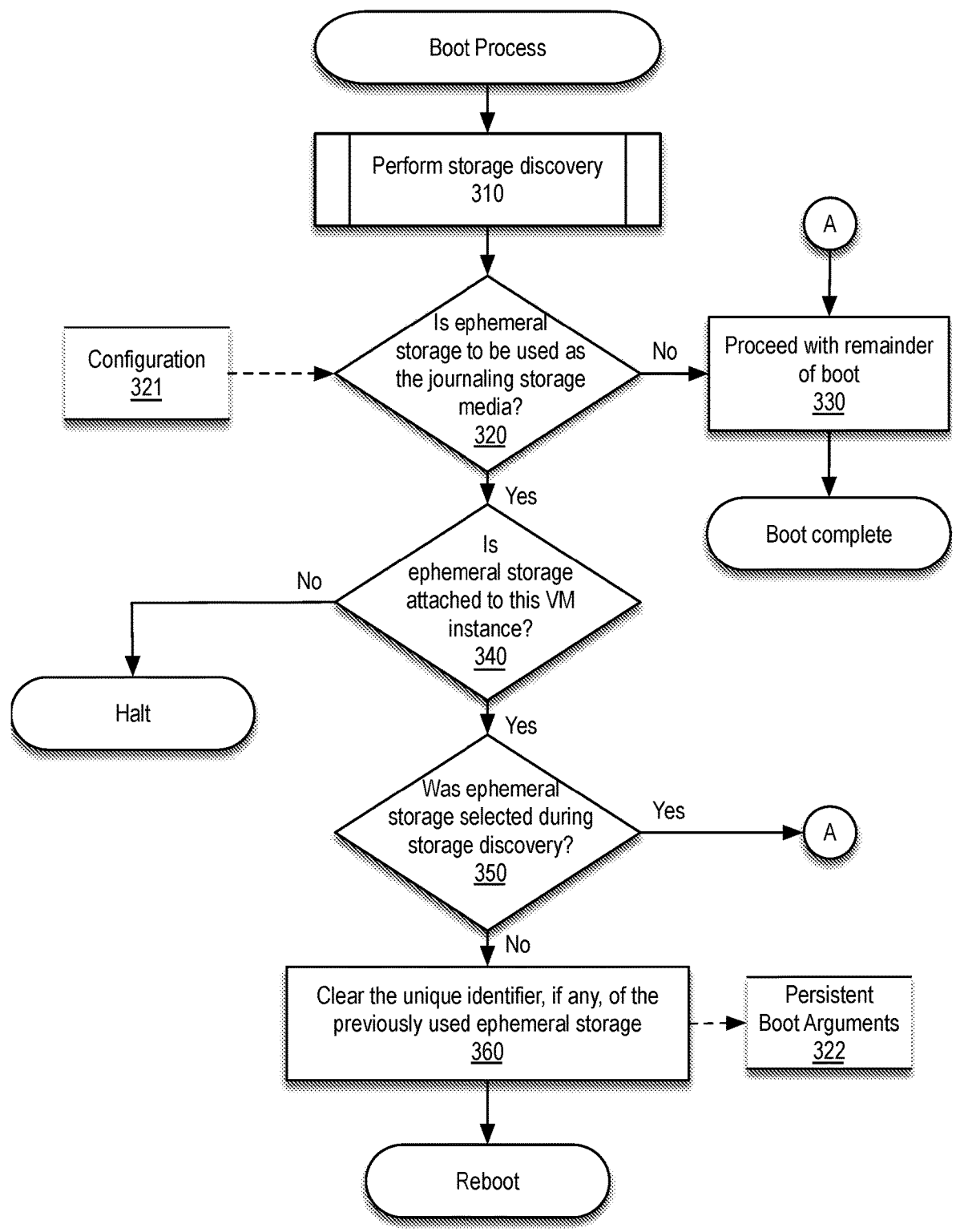
FIG. 3 is a flow diagram illustrating operations for performing a boot process in accordance with an embodiment of the present disclosure.

FIG. 3 is a flow diagram illustrating operations for performing a boot process in accordance with an embodiment of the present disclosure. In various examples described herein, a cloud service provider manages a cluster of virtual storage systems (e.g., virtual storage systems 110a-c), for example, including an HA pair of virtual storage systems within the same AZ of a cloud environment. As a result of cooperation by the cloud service provider (e.g., hyper scaler 120), upon reboot of a given virtual storage system of the HA pair, the given virtual storage system may have access to the same ephemeral storage it was using prior to the reboot. For example, it is assumed upon successful performance of a host error recovery procedure by the cloud service provider, the cloud service provider will bring up a compute instance (e.g., a VM or a container) in which the given virtual storage system is deployed on the same host. In this manner, the data (e.g., an operation log) stored on the previously used ephemeral storage of the compute instance may be preserved (and used, for example, to replay the operation log to restore HA operations) after the compute instance has gone down due to a recoverable host error. Notably, however, despite the cooperation by the cloud service provider, there remain some additional issues to be resolved by the virtual storage system upon reboot as cloud environments do not currently persist the ordering of storage (e.g., cloud volumes) from boot to boot. So, neither the names of the storage nor a convention of simply picking the first ephemeral storage of those discovered upon reboot for use as the journal storage media should be relied upon. In the context of the present example, upon reboot, the virtual storage system makes use of a unique identifier (e.g., a serial number or a vendor unique identifier) of the previously used ephemeral storage to distinguish between various scenarios, for example, by determining whether the virtual storage system has been initially booted, brought up on the same host, or rehosted on a new host (each of which may represent a hosting status of the virtual storage system).

At block 310, a storage discovery process is performed. For example, the virtual storage system may identify the storage associated with the VM instance and assign persistent storage and/or ephemeral storage as appropriate to be used as backing storage for journaling or for a victim cache. A non-limiting example of storage discovery is described below with reference to FIG. 4.

At decision block 320, a determination is made regarding whether ephemeral storage is to be used as the journaling storage media. If so, boot processing continues with decision block 340; otherwise, boot processing branches to block 330. As noted above, the virtual storage system may be configured to make use of ephemeral storage as the backing storage for performance of operation log journaling based on a number of factors, including the characteristics of the HA configuration employed by the cloud service provider and the nature of the workload. In one embodiment, embodiment configuration settings (e.g., configuration 321) of the virtual storage system may contain a flag (e.g., an ephemeral vNVRAM enabled flag) indicating whether ephemeral vNVRAM is enabled. When the flag is true, then the virtual storage system is to use ephemeral storage (e.g., one or more ephemeral disks associated with the compute instance) for its operation log. When the flag is false, the virtual storage system may use persistent storage for its operation log. In one example, the ephemeral vNVRAM enabled flag is set to true responsive to the HA configuration being the Single-AZ HA Configuration and the workload expected to make use of the virtual storage system being an Extreme Low Latency Workload.

At block 330, the virtual storage system proceeds with the remainder of the boot process and boot processing is complete.

At decision block 340, a determination is made regarding whether ephemeral storage is attached to the compute instance. If so, boot processing continues with decision block 350; otherwise, boot processing halts as the desired configuration of the virtual storage system cannot be supported by the compute instance. In one embodiment, an error may be raided or logged or an alert or notification may be issued to an administrative user of the virtual storage system. In one embodiment the determination may be facilitated by the storage discovery process setting a flag indicative ephemeral storage (e.g., at least one ephemeral disk) having been identified.

At decision block 350, it is determined whether ephemeral storage was selected during storage discovery. If so, boot processing branches to block 330; otherwise, boot processing continues with block 360. In one example, this determination may be facilitated by the storage discovery processing setting a flag indicative of ephemeral storage having been selected during storage discovery. According to one embodiment, the successful selection of ephemeral storage during storage discovery indicates one of two scenarios. The first scenario represents selection of new ephemeral storage (e.g., a new ephemeral disk) to be used as backing storage for journaling after the virtual storage system has been rehosted. The second scenario represents the virtual storage system having been redeployed within a compute instance on the same host following recovery from a recoverable host error and as a result the same ephemeral storage the virtual storage system was using previously for operation log journaling has again been selected for use as the backing storage for journaling. Advantageously, in this manner, the same ephemeral storage may be used by the virtual storage system until the compute instance is rehosted, thereby allowing the virtual storage system to replay the operation log and restore HA operations responsive to various ungraceful reboot scenarios (e.g., a VM panic).

At block 360, a unique identifier (e.g., a serial number), if any, of the previously used ephemeral storage by the virtual storage system is cleared. In the context of the present example, a set of boot arguments (e.g., persistent boot arguments 322), including the unique identifier, may be stored on persistent storage to facilitate communication of state information across graceful redeployment on the same host, rehosting on a new host, and from boot to boot. According to one embodiment, boot processing arrives at block 360 as a result of the virtual storage system having previously made use of ephemeral storage attached to a prior host and responsive to an unrecoverable host error, the virtual storage system has been rehosted on a new host. For example, as described with reference to FIG. 4, while the new host has been determined to have attached ephemeral storage, it is not the same ephemeral storage that was being used for journaling when the virtual storage system was operating on the prior host as determined by the different unique identifiers (e.g., serial numbers). In one embodiment, by clearing the previously persisted unique identifier, the storage discovery is free to select new ephemeral storage for use as backing storage for performing operation log journaling.

While in the context of the present example, a number of enumerated blocks are included, it is to be understood that examples may include additional blocks before, after, and/or in between the enumerated blocks. Similarly, in some examples, one or more of the enumerated blocks may be omitted and/or performed in a different order.

While for simplicity in the context of the present example, use of ephemeral storage (e.g., a single ephemeral disk) as the journal storage media may be assumed, it is to be appreciated multiple ephemeral disks may collectively serve as the backing storage for journaling.

Example Storage Discovery

Figure 4:
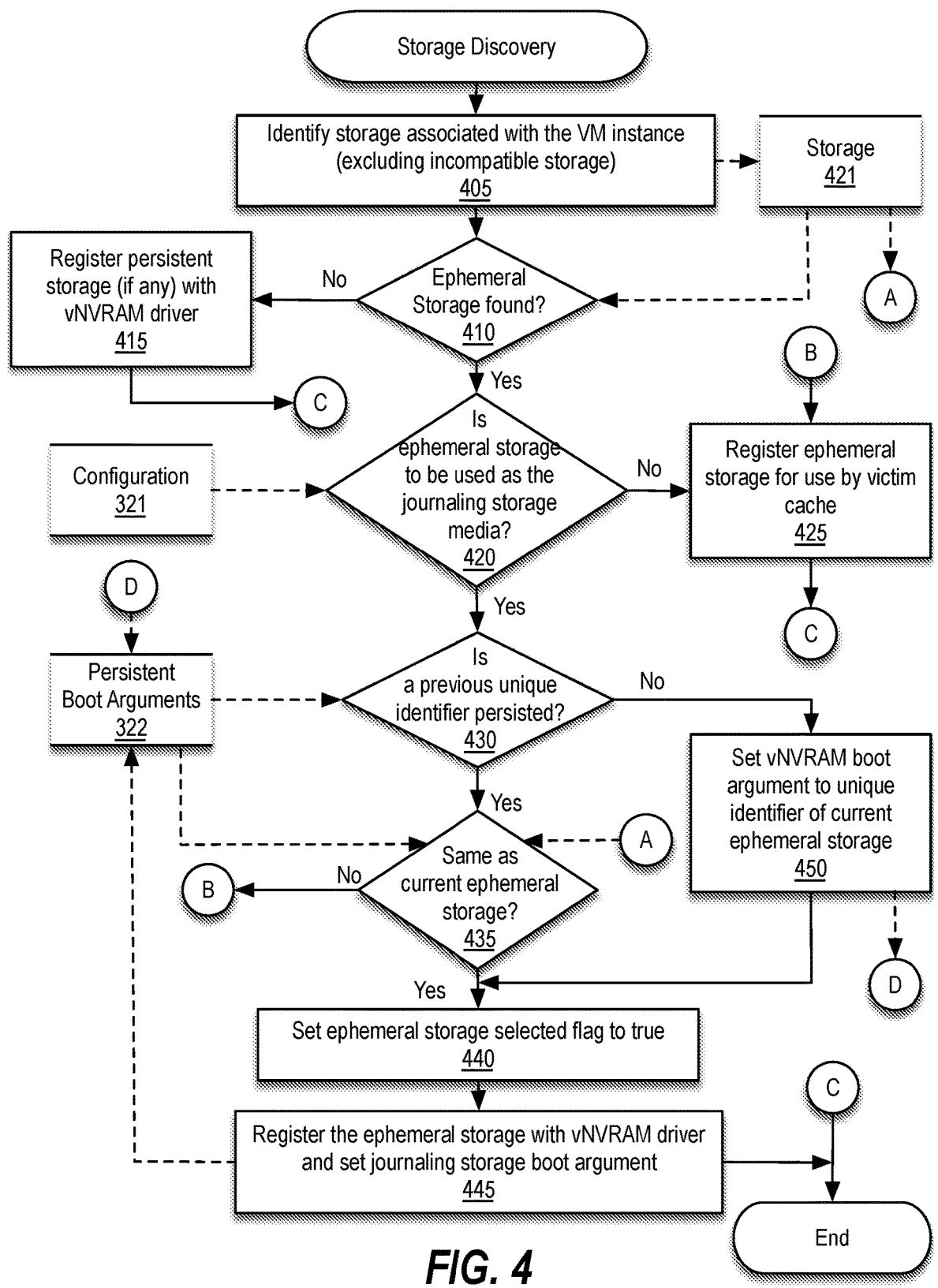
FIG. 4 is a flow diagram illustrating operations for performing storage discovery in accordance with an embodiment of the present disclosure.

FIG. 4 is a flow diagram illustrating operations for performing storage discovery in accordance with an embodiment of the present disclosure. The storage discovery process described with reference to FIG. 4 represents a non-limiting example of storage discovery that may be performed at block 310 of FIG. 3. According to one embodiment, the discovery process described with reference to FIG. 4 may be performed by a virtual storage system (e.g., virtual storage system 110a) that is being brought up on a compute instance in a cloud environment during boot of the virtual storage system.

At block 405, storage (e.g., hyperscale disks 125) associated with the compute instance is identified, for example, in the form of one or more ephemeral and/or persistent disks. In one embodiment, both persistent storage and ephemeral storage attached to the compute instance are identified. In the context of Amazon Web Service (AWS), the virtual storage system may be running within an Amazon Elastic Compute Cloud (EC2) FreeeBSD instance and may determine which volumes are attached to the EC2 instance, obtain respective volume information from the operating system, and store the information within a storage information data store (e.g., storage 421). The volumes may be filtered to exclude those that are incompatible with available drivers. For example, assuming the virtual storage system supports storage media having high-performance and fast response times, volumes that are not compatible with the non-volatile memory express (NVMe) storage access and transport protocol for flash and solid-state drives (SSDs) may be identified and excluded.

At decision block 410, a determination is made regarding whether the storage identified in block 405 includes ephemeral storage (e.g., an ephemeral disk directly attached to the underlying host). If so, processing continues with decision block 420; otherwise, processing branches to block 415. Depending upon the cloud service provider, information regarding the volumes (e.g., volume parameters, such as volume type, serial number, and the like) may be available via one or more methods of an application programming interface (API) exposed by the cloud service provider or via the operating system.

At block 415, as no ephemeral storage is attached to the compute instance, persistent storage (e.g., network attached volumes provided by the cloud service provider) may be used for journaling by registering the persistent storage with a vNVRAM driver of the virtual storage system. For example, the names of persistent storage devices (e.g., /dev/nvd<#>) may be stored within a set of boot arguments (e.g., persistent boot arguments 422) to facilitate identification by downstream processing of the storage selected for use as backing storage for journaling. At this point, storage discovery is complete.

At decision block 420, it is determined whether ephemeral storage is to be used as the journaling storage media. If so, processing continues with decision block 430; otherwise, processing branches to block 425. This determination may be made based on configuration settings (e.g., configuration 451) of the virtual storage system. For example, a flag (e.g., an ephemeral vNVRAM enabled flag) may indicate whether ephemeral vNVRAM is enabled for storage of an operation log. As noted above, this mode of operation may be used when the HA configuration employed by the cloud service provider is the Single-AZ HA Configuration and when the workload expected to make use of the virtual storage system is an Extreme Low Latency Workload.

At block 425, since the ephemeral storage will not be used for journaling, the ephemeral storage may be registered for use for storage of a victim cache of the virtual storage appliance. At this point, storage discovery is complete.

At decision block 430, it is determined whether a previous unique identifier (e.g., serial number) of ephemeral storage has been persisted. If so, processing continues with decision block 435; otherwise processing branches to block 450. In the context of the present example, the existence of a serial number within the set of boot arguments indicates, prior to the boot process (which was presumably triggered as part of an error recovery process), the virtual storage system was making use of ephemeral storage having the unique identifier (e.g., serial number) as the journal storage media.

At decision block 435, a determination is made regarding whether the previous unique identifier of the ephemeral storage matches the unique identifier of the current ephemeral storage. If so, processing continues with block 440; otherwise processing branches to block 424. In the context of the present example, the previously persisted unique identifier being the same as the unique identifier of the current ephemeral storage is indicative of the virtual storage system having been brought up within a compute instance on the same physical host after recovery from a recoverable host error. As a result, the journal previously maintained by the virtual storage system remains accessible and may be used to facilitate restoration of HA operations, for example, by replaying the operations journaled prior to the failure.

At block 450, a vNVRAM boot argument of the set of boot arguments is set to the unique identifier of the current ephemeral storage attached to the compute instance in which the virtual storage system is running. In the context of the present example, arriving at block 450 may be indicative of the compute instance having been rehosted and the unique identifier having been cleared, for example, at block 360 of FIG. 3. Alternatively, arriving at block 450 may be indicative of an initial boot. In the case of the former, the journal previously maintained by the virtual storage system on the prior host is no longer accessible. In either case, new ephemeral storage is selected for use as the backing storage for journaling and processing continues with block 440.

At block 440, a flag (e.g., an ephemeral storage selected flag) is set to true to communicate to the boot process the ephemeral storage identified by the unique identifier currently stored in the set of boot arguments is to be used as the backing storage for journaling. In one embodiment, this flag is initialized to false at the start of each boot. In the context of the present example, this flag is set to true responsive to selecting new ephemeral storage at block 450, for example, responsive to being rehosted. This flag may also be set to true responsive to the virtual storage system determining it is running within a compute instance that was brought up by the cloud service provider on the same physical host, for example, after recovery from a recoverable host error.

At block 445, the selected ephemeral storage is registered with the vNVRAM driver and a journaling storage boot argument is set. For example, the name of the ephemeral storage may be stored within a set of boot arguments to facilitate identification by downstream processing of the ephemeral storage selected for use as backing storage for journaling. At this point, storage discovery is complete.

While in the context of the present example, a number of enumerated blocks are included, it is to be understood that examples may include additional blocks before, after, and/or in between the enumerated blocks. Similarly, in some examples, one or more of the enumerated blocks may be omitted and/or performed in a different order.

While in the context of the present example, reference is made to a serial number of storage (as a non-limiting example of a unique identifier), it is to be appreciated other unique identifiers that uniquely identify the storage may be used, for example, other unique identifiers provided by the cloud service provider or the host may be used if available.

While for simplicity in the context of the present example, use of a single ephemeral storage as the journal storage media may be assumed, it is to be appreciated multiple ephemeral storage may collectively serve as the backing storage for journaling. For example, in one embodiment, responsive to identification of multiple ephemeral disks when the ephemeral vNVRAM enabled flag is true, the multiple ephemeral disks may be split with a first portion (e.g., half) of the ephemeral disks being selected for use for journaling and a second portion being selected for use for the victim cache. In one embodiment, when multiple ephemeral disks are selected for use for journaling and/or the victim cache, RAID 0 (disk striping) may be used to spread the journaling data blocks and/or the victim cache data blocks (as the case may be) across the multiple ephemeral disks.

In one examples, as an alternative to dividing up multiple ephemeral disks between journaling and the victim cache as the disk level, journaling and the victim cache may make use of a common set of disks but different partitions across the common set of disks. For example, a first partition (e.g., partition 0) may be assigned for use by the victim cache on each of the common set of disks and a second partition (e.g., partition 1) may be assigned for use by journaling on each of the common set of disk. In one embodiment, the victim cache and journaling may perform RAID 0 striping across the common set of disks using their respective assigned partitions across the common set of disks. In this manner, better utilization of the ephemeral disk storage capacity may be achieved as the partition used by the victim cache is expected to represent a relatively larger portion of the consumed storage than used by journaling.

In various examples described herein, a unique identifier (e.g., a serial number) of ephemeral storage is used because cloud service providers do not currently guarantee the same ordering of volumes across boots. For example, in a first boot, an ephemeral disk could be /dev/nv4, whereas in a subsequent boot, the same ephemeral disk may be presented as /dev/nv7. To the extent a cloud service provider were to guarantee the same ordering of volumes across boots in the future, in alternative embodiments, the first ephemeral disk may be selected, by convention, for use as the backing storage media for journaling.

Using the methodologies described herein, a virtual storage system can tolerate (i) reboot, (ii) compute instance panic (e.g., VM panic), (iii) recoverable host failures, and (iv) AZ outages. In those scenarios resulting in a dirty vNVRAM (i.e., (ii) through (iv)), since the compute instance remains on the same host, the convents of the vNVRAM (e.g., the journal entries of the operation log journal) may be replayed during the boot process to reconstruct the current state of the stored data prior to the failure and to restore HA operations of an HA pair of virtual storage systems.

Example Computer System

Embodiments of the present disclosure include various steps, which have been described above. The steps may be performed by hardware components or may be embodied in machine-executable instructions, which may be used to cause a processing resource (e.g., a general-purpose or special-purpose processor) programmed with the instructions to perform the steps. Alternatively, depending upon the particular implementation, various steps may be performed by a combination of hardware, software, firmware and/or by human operators.

Embodiments of the present disclosure may be provided as a computer program product, which may include a non-transitory machine-readable storage medium embodying thereon instructions, which may be used to program a computer (or other electronic devices) to perform a process. The machine-readable medium may include, but is not limited to, fixed (hard) drives, magnetic tape, floppy diskettes, optical disks, compact disc read-only memories (CD-ROMs), and magneto-optical disks, semiconductor memories, such as ROMs, PROMs, random access memories (RAMs), programmable read-only memories (PROMs), erasable PROMs (EPROMs), electrically erasable PROMs (EEPROMs), flash memory, magnetic or optical cards, or other type of media/machine-readable medium suitable for storing electronic instructions (e.g., computer programming code, such as software or firmware).

Various methods described herein may be practiced by combining one or more non-transitory machine-readable storage media containing the code according to embodiments of the present disclosure with appropriate special purpose or standard computer hardware to execute the code contained therein. An apparatus for practicing various embodiments of the present disclosure may involve one or more computers (e.g., physical and/or virtual servers) (or one or more processors within a single computer) and storage systems containing or having network access to computer program(s) coded in accordance with various methods described herein, and the method steps associated with embodiments of the present disclosure may be accomplished by modules, routines, subroutines, or subparts of a computer program product.

Figure 5:
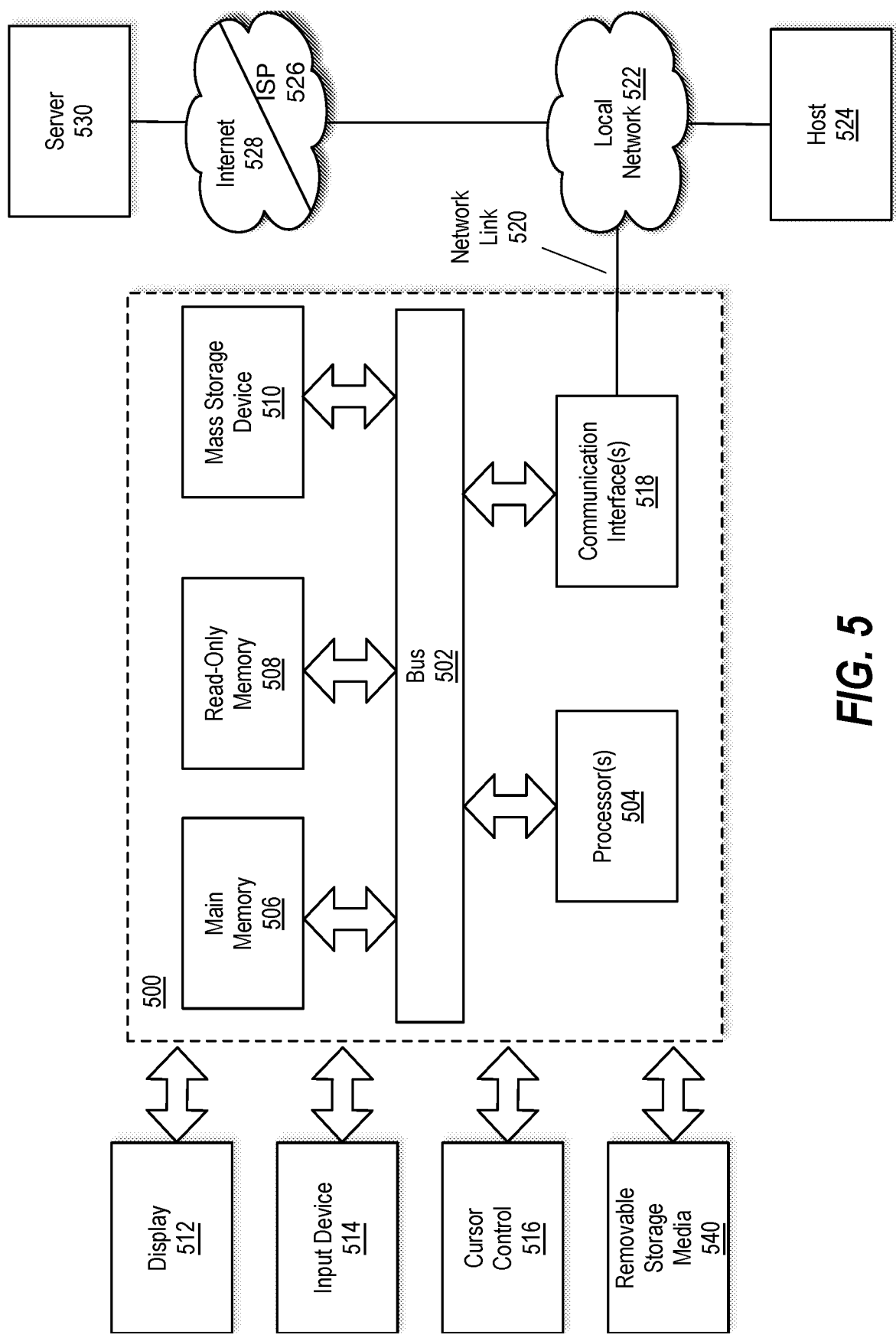
FIG. 5 illustrates an example computer system in which or with which embodiments of the present disclosure may be utilized.

FIG. 5 is a block diagram that illustrates a computer system 500 in which or with which an embodiment of the present disclosure may be implemented. Computer system 500 may be representative of all or a portion of the computing resources of a physical host (e.g., host 200) on which a virtual storage system (e.g., one of virtual storage systems 110a-c) of a distributed storage system is deployed. Notably, components of computer system 500 described herein are meant only to exemplify various possibilities. In no way should example computer system 500 limit the scope of the present disclosure. In the context of the present example, computer system 500 includes a bus 502 or other communication mechanism for communicating information, and a processing resource (e.g., a hardware processor 504) coupled with bus 502 for processing information. Hardware processor 504 may be, for example, a general purpose microprocessor.

Computer system 500 also includes a main memory 506, such as a random access memory (RAM) or other dynamic storage device, coupled to bus 502 for storing information and instructions to be executed by processor 504. Main memory 506 also may be used for storing temporary variables or other intermediate information during execution of instructions to be executed by processor 504. Such instructions, when stored in non-transitory storage media accessible to processor 504, render computer system 500 into a special-purpose machine that is customized to perform the operations specified in the instructions.

Computer system 500 further includes a read only memory (ROM) 508 or other static storage device coupled to bus 502 for storing static information and instructions for processor 504. A storage device 510, e.g., a magnetic disk, optical disk or flash disk (made of flash memory chips), is provided and coupled to bus 502 for storing information and instructions.

Computer system 500 may be coupled via bus 502 to a display 512, e.g., a cathode ray tube (CRT), Liquid Crystal Display (LCD), Organic Light-Emitting Diode Display (OLED), Digital Light Processing Display (DLP) or the like, for displaying information to a computer user. An input device 514, including alphanumeric and other keys, is coupled to bus 502 for communicating information and command selections to processor 504. Another type of user input device is cursor control 516, such as a mouse, a trackball, a trackpad, or cursor direction keys for communicating direction information and command selections to processor 504 and for controlling cursor movement on display 512. This input device typically has two degrees of freedom in two axes, a first axis (e.g., x) and a second axis (e.g., y), that allows the device to specify positions in a plane.

Removable storage media 540 can be any kind of external storage media, including, but not limited to, hard-drives, floppy drives, IOMEGA® Zip Drives, Compact Disc-Read Only Memory (CD-ROM), Compact Disc-Re-Writable (CD-RW), Digital Video Disk-Read Only Memory (DVD-ROM), USB flash drives and the like.

Computer system 500 may implement the techniques described herein using customized hard-wired logic, one or more ASICs or FPGAs, firmware or program logic which in combination with the computer system causes or programs computer system 500 to be a special-purpose machine.

According to one embodiment, the techniques herein are performed by computer system 500 in response to processor 504 executing one or more sequences of one or more instructions contained in main memory 506. Such instructions may be read into main memory 506 from another storage medium, such as storage device 510. Execution of the sequences of instructions contained in main memory 506 causes processor 504 to perform the process steps described herein. In alternative embodiments, hard-wired circuitry may be used in place of or in combination with software instructions.

The term "storage media" as used herein refers to any non-transitory media that store data or instructions that cause a machine to operation in a specific fashion. Such storage media may comprise non-volatile media or volatile media. Non-volatile media includes, for example, optical, magnetic or flash disks, such as storage device 510. Volatile media includes dynamic memory, such as main memory 506. Common forms of storage media include, for example, a flexible disk, a hard disk, a solid state drive, a magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 502. Transmission media can also take the form of acoustic or light waves, such as those generated during radio-wave and infra-red data communications.

Various forms of media may be involved in carrying one or more sequences of one or more instructions to processor 504 for execution. For example, the instructions may initially be carried on a magnetic disk or solid state drive of a remote computer. The remote computer can load the instructions into its dynamic memory and send the instructions over a telephone line using a modem. A modem local to computer system 500 can receive the data on the telephone line and use an infra-red transmitter to convert the data to an infra-red signal. An infra-red detector can receive the data carried in the infra-red signal and appropriate circuitry can place the data on bus 502. Bus 502 carries the data to main memory 506, from which processor 504 retrieves and executes the instructions. The instructions received by main memory 506 may optionally be stored on storage device 510 either before or after execution by processor 504.

Computer system 500 also includes a communication interface 518 coupled to bus 502. Communication interface 518 provides a two-way data communication coupling to a network link 520 that is connected to a local network 522. For example, communication interface 518 may be an integrated services digital network (ISDN) card, cable modem, satellite modem, or a modem to provide a data communication connection to a corresponding type of telephone line. As another example, communication interface 518 may be a local area network (LAN) card to provide a data communication connection to a compatible LAN. Wireless links may also be implemented. In any such implementation, communication interface 518 sends and receives electrical, electromagnetic or optical signals that carry digital data streams representing various types of information.

Network link 520 typically provides data communication through one or more networks to other data devices. For example, network link 520 may provide a connection through local network 522 to a host computer 524 or to data equipment operated by an Internet Service Provider (ISP) 526. ISP 526 in turn provides data communication services through the worldwide packet data communication network now commonly referred to as the "Internet" 528. Local network 522 and Internet 528 both use electrical, electromagnetic or optical signals that carry digital data streams. The signals through the various networks and the signals on network link 520 and through communication interface 518, which carry the digital data to and from computer system 500, are example forms of transmission media.

Computer system 500 can send messages and receive data, including program code, through the network(s), network link 520 and communication interface 518. In the Internet example, a server 530 might transmit a requested code for an application program through Internet 528, ISP 526, local network 522 and communication interface 518. The received code may be executed by processor 504 as it is received, or stored in storage device 510, or other non-volatile storage for later execution.

All examples and illustrative references are non-limiting and should not be used to limit the applicability of the proposed approach to specific implementations and examples described herein and their equivalents. For simplicity, reference numbers may be repeated between various examples. This repetition is for clarity only and does not dictate a relationship between the respective examples. Finally, in view of this disclosure, particular features described in relation to one aspect or example may be applied to other disclosed aspects or examples of the disclosure, even though not specifically shown in the drawings or described in the text.

The foregoing outlines features of several examples so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the examples introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. A method comprising:
discovering, by a virtual storage system deployed within a compute instance of a host of a public cloud, one or more direct-attached storage (DAS) devices of the host that are associated with the compute instance;
determining, by the virtual storage system, the virtual storage system has been brought up on the host after recovery from a failure; and
regaining access to an operation log that was maintained by the virtual storage system within the discovered one or more DAS devices prior to the failure by registering at least a subset of the discovered one or more DAS devices for use as a journaling storage media by the virtual storage system.

2. The method of claim 1, wherein said discovering is performed during a boot process of the virtual storage system.

3. The method of claim 1, wherein said determining is based on comparing one or more arguments retrieved from persistent storage associated with the compute instance and one or more unique identifiers of the discovered one or more DAS devices.

4. The method of claim 1, wherein the subset of the discovered one or more DAS devices includes at least two solid-state drives (SSDs) and wherein the method further comprises spreading data blocks associated with the operation log across the at least two SSDs by performing disk striping.

5. The method of claim 1, wherein the compute instance comprises a virtual machine.

6. The method of claim 1, wherein the compute instance comprises a container.

7. A virtual storage system comprising:
- a processing resource; and
- a non-transitory computer-readable medium, coupled to the processing resource, having stored therein instructions that when executed by the processing resource cause the virtual storage system to:
- discover one or more direct-attached storage (DAS) devices of a host that are associated with a compute instance of a public cloud in which the virtual storage system is deployed;
- determine a hosting status of the virtual storage system; and
- when the hosting status is indicative of the virtual storage system having been brought up on the host on which the virtual storage system was hosted prior to recovery from a failure, regain access to an operation log that was maintained by the virtual storage system within the one or more DAS devices prior to the failure by registering at least a subset of the one or more DAS devices for use as a journaling storage media by the virtual storage system.

8. The virtual storage system of claim 7, wherein the one or more DAS devices comprise solid-state drives (SDDs).

9. The virtual storage system of claim 7, wherein the instructions further cause the virtual storage system to facilitate maintenance of a new operation log by the virtual storage system within the subset of the one or more DAS devices when the hosting status is indicative of the virtual storage system having been rehosted.

10. The virtual storage system of claim 7, wherein discovery of the one or more DAS devices is performed during a boot process of the virtual storage system.

11. The virtual storage system of claim 7, wherein the hosting status is determined based on comparing one or more arguments retrieved from persistent storage associated with the compute instance and a unique identifier of a DAS device of the one or more DAS devices.

12. The virtual storage system of claim 7, wherein the instructions further cause virtual storage system to spread data blocks associated with the operation log across the subset of the one or more DAS devices by performing disk striping.

13. The virtual storage system of claim 7, wherein the compute instance comprises a virtual machine.

14. The virtual storage system of claim 7, wherein the compute instance comprises a container.

15. A non-transitory machine readable medium storing instructions, which when executed by a processing resource of a virtual storage system deployed within a compute instance of a host of a public cloud, cause the virtual storage system to:
- discover one or more direct-attached storage (DAS) devices of the host that are associated with the compute instance;
- determine a hosting status of the virtual storage system; and
- when the hosting status is indicative of the virtual storage system having been brought up on the host on which the virtual storage system was hosted prior to recovery from a failure, regain access to an operation log that was maintained by the virtual storage system within the one or more DAS devices prior to the failure by registering at least a subset of the one or more DAS devices for use as a journaling storage media by the virtual storage system.

16. The non-transitory machine readable medium of claim 15, wherein the instructions further cause the virtual storage system to facilitate maintenance of a new operation log by the virtual storage system within the subset of the one or more DAS devices when the hosting status is indicative of the virtual storage system having been rehosted.

17. The non-transitory machine readable medium of claim 15, wherein discovery of the one or more DAS devices is performed during a boot process of the virtual storage system.

18. The non-transitory machine readable medium of claim 15, wherein the hosting status is determined based on comparing one or more arguments retrieved from persistent storage associated with the compute instance and a unique identifier of a DAS device of the one or more DAS devices.

19. The non-transitory machine readable medium of claim 15, wherein the subset of the one or more DAS devices includes at least two solid-state drives (SSDs) and wherein the instructions further cause the virtual storage system to spread data blocks associated with the operation log across the at least two SSDs by performing disk striping.

20. The non-transitory machine readable medium of claim 15, wherein the compute instance comprises a virtual machine or a container.

\* \* \* \* \*